(No Model.)
ESTANISLAO CABALLERO DE LOS OLIVOS.
ANIMAL TRAP.
No. 538,118. Patented Apr. 23, 1895.
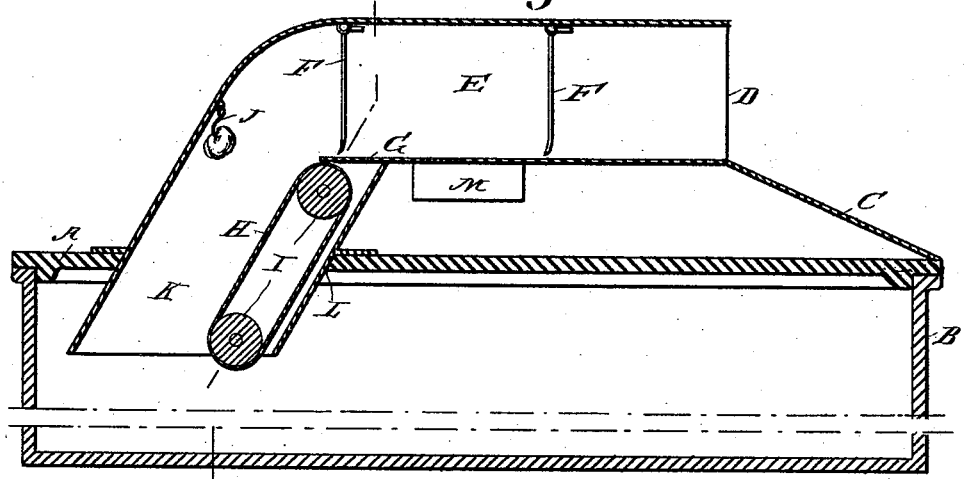
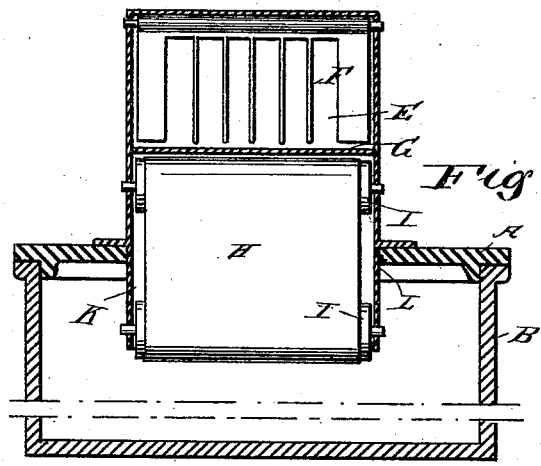
WITNESSES:
INVENTOR
Estanislao Caballero
de los Olivos
BY
Munn & Co.
ATTORNEYS.

UNITED STATES PATENT OFFICE.

ESTANISLAO CABALLERO DE LOS OLIVOS, OF NEW YORK, N. Y.

ANIMAL-TRAP.

SPECIFICATION forming part of Letters Patent No. 538,118, dated April 23, 1895.

Application filed February 11, 1895. Serial No. 537,914. (No model.)

*To all whom it may concern:*

Be it known that I, ESTANISLAO CABALLERO DE LOS OLIVOS, a citizen of the Republic of Mexico, temporarily residing in New York city, in the county and State of New York, have invented certain new and useful Improvements in Animal-Traps, of which the following is a full, clear, and exact description, reference being had to the accompanying drawings, which form a part of this specification.

My invention relates to traps for catching rats and other animals, and has for its object more particularly to improve that class of traps in which the animal caught is thrown into a suitable receptacle, so that the trap proper is always set and free to be entered by other animals.

The construction of parts which constitute my improvement will appear from the description following hereinafter, and the features of novelty will be pointed out in the claims.

In the drawings: Figure 1 is a longitudinal section of my improved trap. Fig. 2 is a transverse section thereof on line 2—2 of Fig. 1; and Fig. 3 is a view similar to Fig. 1 and representing a modification.

Like letters describe like parts in all the views.

The trap consists primarily of a base A adapted to be set on the top of a suitable jar or other vessel B which is supposed to be filled with water or some other liquid. At one end of the base A is an inclined plate C or an equivalent part whereby the animals to be caught may find access to the inlet opening D of a channel E, which extends substantially horizontal and is provided with one or more inwardly opening gates F made of depending wires whose pointed ends are curved inward. The innermost door F is located adjacent to the inner end of the bottom G of the channel E, and as shown in Fig. 1 in immediate proximity to the upper end of a belt H which is mounted upon rollers I. The bait is usually suspended upon a hook J in an inclined chute K and the belt H is likewise located in said chute. The latter extends through an opening L in the base A and is open at the bottom. The rat or other animal, after passing through the channel E and the innermost gate or door F tries to reach the bait and in so doing steps on the belt H which yields under the weight of the animal and traveling downward on the rollers I causes the animal to be thrown down the chute and into the vessel below. It is intended to place the bait out of the reach of the animal, so that the trap is always set.

The modification shown in Fig. 3 differs from the hereinbefore described construction in that the chute K is inclined in the opposite direction and the belt H is located at a distance from the inner end of the bottom G of the channel E. In this case the rat in trying to reach the bait will jump on the belt, with analogous results to those before described.

It will be understood that the swinging gates F prevent the rat from returning after entering the channel E, the innermost door preventing the rat from gaining a hold on the inner end of the channel.

It will be further understood that the trap is entirely closed with the exception of the opening D so that no other access is afforded to the bait.

I do not confine myself to the exact construction shown in the drawings, but it will be understood that various changes and additions may be made within the scope of the appended claims. For instance the bait may be located within the channel E but in an inaccessible position between two doors or gates F, as the animal, when it finds out the bait is inaccessible, will try to get out of the trap and thus will step on the belt H; or the bait may be located below the channel E, in a box M, provided for that purpose, the box having a removable lid.

What I claim, and desire to secure by Letters Patent, is—

1. An animal trap, provided with an opening for the entrance of the animal, an outlet through which the animal may be thrown out, and an inclined belt arranged adjacent to the said outlet and adapted to travel downward under the weight of the animal, to throw the latter into a suitable receptacle, substantially as described.

2. An animal trap, provided with an outlet an inclined belt arranged adjacent to the said outlet and adapted to travel downward under the weight of the animal, and an entrance channel leading to the said belt, substantially as described.

3. An animal trap, provided with an opening for the entrance of the animal, a channel leading from the said opening and provided with inwardly-opening doors, an inclined chute connected to the inner end of the said channel, and an inclined belt on the lower side of the said chute to form a movable bottom therefor, substantially as described.

4. An animal trap, provided with a channel leading inwardly from an opening in the trap, and provided with inwardly-opening doors, and an inclined belt located adjacent to the inner end of the channel and adapted to travel downward under the weight of an animal stepping thereon, substantially as described.

5. The combination of the apertured base, the chute leading to the aperture in the base, the inclined movable belt in the chute, and the channel leading outward from the chute to the inlet opening of the trap, substantially as described.

ESTANISLAO CABALLERO DE LOS OLIVOS.

Witnesses:
JOHN LOTKA,
JNO. M. RITTER.